(12) United States Patent
Krishnamurthy

(10) Patent No.: US 9,443,024 B2
(45) Date of Patent: *Sep. 13, 2016

(54) METHOD AND APPARATUS TO IDENTIFY OUTLIERS IN SOCIAL NETWORKS

(71) Applicant: AT&T Intellectual Property I, LP, Atlanta, GA (US)

(72) Inventor: Balachander Krishnamurthy, New York, NY (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/705,123

(22) Filed: May 6, 2015

(65) Prior Publication Data

US 2015/0234928 A1 Aug. 20, 2015

Related U.S. Application Data

(63) Continuation of application No. 14/231,964, filed on Apr. 1, 2014, now Pat. No. 9,059,897, which is a continuation of application No. 12/892,208, filed on Sep. 28, 2010, now Pat. No. 8,775,605.

(60) Provisional application No. 61/246,897, filed on Sep. 29, 2009.

(51) Int. Cl.
*G06F 17/30* (2006.01)

(52) U.S. Cl.
CPC ... *G06F 17/30867* (2013.01); *G06F 17/30595* (2013.01); *G06F 17/30958* (2013.01)

(58) Field of Classification Search
CPC .............................. H04L 43/045; G06Q 10/10
See application file for complete search history.

(56) References Cited

U.S. PATENT DOCUMENTS

| 8,510,230 | B2 | 8/2013 | John et al. | |
|---|---|---|---|---|
| 2006/0270421 | A1* | 11/2006 | Phillips | G08B 21/0236 455/457 |
| 2006/0271620 | A1 | 11/2006 | Beaty et al. | |
| 2008/0104225 | A1 | 5/2008 | Zhang et al. | |
| 2008/0201464 | A1 | 8/2008 | Campbell et al. | |
| 2008/0228767 | A1* | 9/2008 | Kenedy | G06Q 40/00 |
| 2008/0270615 | A1* | 10/2008 | Centola | G06Q 10/10 709/228 |
| 2009/0013074 | A1 | 1/2009 | Rice | |
| 2009/0034430 | A1 | 2/2009 | Popoviciu et al. | |
| 2009/0037211 | A1* | 2/2009 | McGill | G06Q 10/10 705/319 |
| 2009/0041329 | A1* | 2/2009 | Nordell | G06F 19/321 382/134 |

(Continued)

*Primary Examiner* — Asad Nawaz
*Assistant Examiner* — Syed S Ali
(74) *Attorney, Agent, or Firm* — Guntin & Gust, PLC; Ralph Trementozzi

(57) ABSTRACT

A system that incorporates teachings of the present disclosure may include, for example, a process that reduces a sampling size of a total population of on-line social network users based on a comparison of seed information to a population of on-line social network users. The reduced sampling of on-line social network users is compared to a social graph of the on-line social network users, wherein the social graph is obtained from an algorithm applied to the reduced sampling of the on-line social network users. An outlier is determined in the reduced sampling of on-line social network users based on relationships between the on-line social network users. The determining of the outlier is also based on one of ambient or publicly available information combined with an intra-graph property of the on-line social network users, wherein the outlier does not conform to the social graph. Additional embodiments are disclosed.

20 Claims, 9 Drawing Sheets

(56) References Cited

U.S. PATENT DOCUMENTS

| | | |
|---|---|---|
| 2009/0112701 A1 | 4/2009 | Turpin et al. |
| 2009/0113036 A1 | 4/2009 | Zampiello |
| 2009/0228582 A1 | 9/2009 | White et al. |
| 2009/0254651 A1 | 10/2009 | Sheppard |
| 2009/0319518 A1 | 12/2009 | Koudas et al. |
| 2010/0030578 A1 | 2/2010 | Siddique |
| 2010/0030715 A1 | 2/2010 | Eustice et al. |
| 2010/0094863 A1 | 4/2010 | Kenton-Dau et al. |
| 2010/0145771 A1* | 6/2010 | Fligler .................. G06Q 10/10 705/319 |
| 2010/0161790 A1 | 6/2010 | Sheppard |
| 2010/0185760 A1 | 7/2010 | Nakahira |
| 2010/0268719 A1 | 10/2010 | Cormode et al. |
| 2011/0103682 A1* | 5/2011 | Chidlovskii ......... G06K 9/6284 382/159 |
| 2011/0178943 A1* | 7/2011 | Motahari ............ G06F 21/6254 705/325 |
| 2011/0225417 A1 | 9/2011 | Maharajh |
| 2011/0258044 A1* | 10/2011 | Kargupta ............... G06Q 10/08 705/14.49 |
| 2012/0047184 A1 | 2/2012 | Purdy |
| 2012/0237908 A1 | 9/2012 | Fitzgerald et al. |
| 2013/0073473 A1 | 3/2013 | Heath |
| 2013/0138748 A1 | 5/2013 | Groves |
| 2013/0151991 A1 | 6/2013 | Kimball et al. |
| 2013/0205231 A1 | 8/2013 | Vandermolen et al. |
| 2013/0297942 A1* | 11/2013 | Conwell ................ G06Q 10/00 713/176 |

* cited by examiner

1200

Table 1: Twitter Sources

| Crawl | | Source | Timeline | |
|---|---|---|---|---|
| % | Statuses | | % | Statuses |
| 61.7 | 40,163 | Web | 57.0 | 20,510 |
| 7.5 | 4,901 | txt (mobile) | 7.4 | 2,667 |
| 7.2 | 4,674 | IM | 7.5 | 2,714 |
| 1.2 | 792 | Facebook | 0.7 | 261 |
| 22.4 | 14,566 | Custom Applications | 27.3 | 9,821 |

FIG. 14

METHOD AND APPARATUS TO IDENTIFY OUTLIERS IN SOCIAL NETWORKS

CROSS-REFERENCE TO RELATED APPLICATIONS

This application is a Continuation of and claims priority to U.S. patent application Ser. No. 14/231,964, filed Apr. 1, 2014, which is a Continuation of and claims priority to U.S. patent application Ser. No. 12/892,208 filed Sep. 28, 2010 (now U.S. Pat. No. 8,775,605), which claims priority to U.S. Provisional Application Ser. No. 61/246,897 filed on Sep. 29, 2009. The contents of each of the foregoing are hereby incorporated by reference into this application as if set forth herein in full.

FIELD OF THE DISCLOSURE

The present disclosure relates generally to social networking, and more specifically to a method and apparatus to identify outliers in social networks.

BACKGROUND

On-line social networks (OSNs) have grown in popularity over the years. OSNs such as FaceBook, MySpace, and Twitter, have growing populations of users numbering in the hundreds of millions. Although a substantial portion of the information presented by OSNs is publicly available subject to privacy profile settings of users, it can be a daunting task to identify outliers (persons or entities) that stand out in these networks.

BRIEF DESCRIPTION OF THE DRAWINGS

FIG. 14 depicts TABLE 1, providing an illustrative embodiment of Twitter sources.

DETAILED DESCRIPTION

Figure 1:
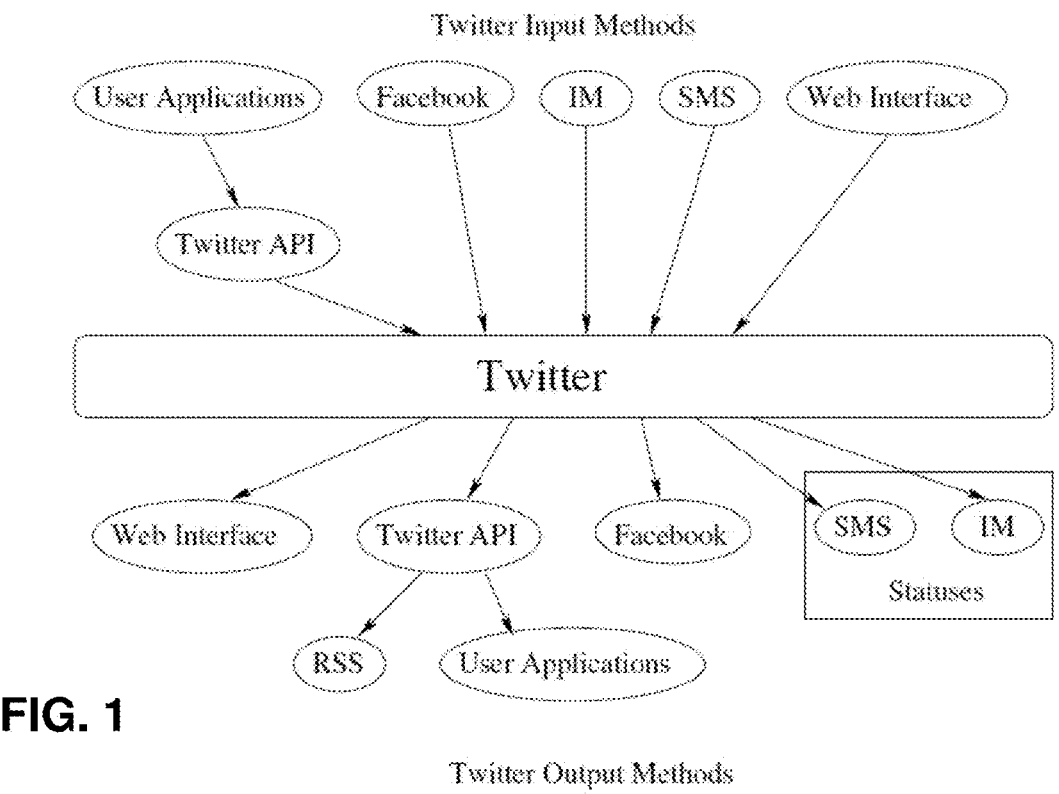
FIG. 1 depicts an illustrative embodiment of input and output methods used for one OSN which by example is Twitter.

The present disclosure includes methods and systems for identification of induced subgraphs based on a variety of seed information related to one or more persons or groups on OSNs. Among the applications of the exemplary embodiments is use of the publicly available information for identifying outliers, such as for the benefit of law enforcement agencies.

In one exemplary embodiment, a method is provided that can include obtaining seed information, reducing a sampling size of a total population of OSN users according to the seed information using a processor, comparing the reduced sampling of OSN users to at least one of a social graph or a generalized profile of OSN users determined from the total population of OSN users where the comparison is performed by the processor, and identifying one or more outliers in the reduced sampling of OSN users that do not conform to the social graph or the generalized profile of OSN users.

In another exemplary embodiment, a computing device can include an interface for receiving seed information, and a controller to identify one or more outliers from a reduced sampling of a total population of OSN users according to the seed information and at least one of a social graph or a generalization of portions of the total population of OSN users.

In yet another exemplary embodiment, a non-transitory computer-readable storage medium is provided that can include computer instructions to reduce a sampling size of a population of OSN users, compare the reduced sampling of OSN users to at least one of a social graph or a generalized profile of OSN users determined from the population of OSN users, and identify one or more outliers in the reduced sampling of OSN users that do not conform to the social graph or the generalized profile of OSN users.

OSNs have emerged as the most popular application since the Web began in the early 1990s. Coincident with the growth of Web 2.0 applications (such as mashups, user generated content) and users being treated as first class objects, numerous social networks along with thousands of helper applications have arisen. Well known among them are Facebook, MySpace, Friendster, Bebo, hi5, and Xanga. Facebook alone has over 500 million users. Many applications have been created to use the distribution platform provided by OSNs. For example, popular games like Scrabulous, allow many hundreds of thousands of users on Facebook to play the game with their social network friends. A few smaller networks with superficial similarities to the larger OSNs have started recently. Some of these began as simple helper applications that work well with the larger OSNs, but then became popular in their own right.

A key distinguishing factor of these smaller networks is that they provide a new means of communication. In the case of Twitter, it is Short Message Service (SMS), a store and forward best effort delivery system for text messages. In the case of qik, it is streaming video from cell phones. Jaiku, another small OSN, allows people to share their "activity stream. Location-based social networks include Foursquare and Gowalla. GyP-Sii, a Dutch OSN, is aimed at the mobile market exclusively, combining geo-location of users with image uploading and works on various cell phones including Apple's iPhone. Close to Twitter, a mobile OSN that encourages constant updates is Bliin. Other examples of exclusively mobile social networks include Itsmy and MyGamma.

A distinguishing factor of such smaller networks and applications is their ability to deliver the data to interested users over multiple delivery channels. For example, Twitter messages can be received by users as a text message on their cell phone, through a Facebook application that users have added to their Facebook account to see the messages when they log in, via email, as an RSS feed, or as an Instant Message (with a choice of Jabber, GoogleTalk etc.). FIG. 1 shows the various input and output vectors to send and receive Twitter status update messages ("tweets"). The types of communications used (e.g., IM, SMS, Web Interface, etc.) can be utilized as factors in determining outliers in an OSN. Twitter is an example of a micro-content OSN, as opposed to say, YouTube, where individual videos uploaded are much larger. Individual tweets are limited to 140 characters due to the SMS limit. Twitter is but one example of an OSN, and has a very distinct architecture. The exemplary embodiments described herein for determining outliers in OSNs can be applied to Twitter, and can also be applied to other OSNs which may or may not have architectures that are distinct from Twitter.

Twitter began in October 2006 and is written using Ruby on Rails. It was determined that users from a dozen countries are heavily represented in the user population but significantly less than the U.S. Recently, Twitter has made interesting inroads into novel domains, such as help during a large-scale fire emergency, updates during riots in Kenya, and live traffic updates to track commuting delays.

The present disclosure allows for characterizing a novel communication network in depth, its user base and geographical spread, and compare results of different crawling techniques in the presence of constraints from a generic measurement point of view. In one example, we conducted various crawls of the Twitter network and developed a detailed characterization of the Twitter network. This information can further be utilized for identifying anomalies or outliers in the user population.

The present disclosure can utilize various data collection methods, but preferably two main data collection methods are utilized, both relying on the Application Programming Interface (API) functions provided by Twitter. In one embodiment, detailed information can be gathered on the users and the list of users each of them were following. The constraint on the number of queries that could be issued in a day can be the key limiting artifact in the reach of our crawl. A Twitter user interested in the statuses of another user signs up to be a "follower." The "public timeline" API method can also be used, which returns a list of the twenty most recent statuses posted to Twitter.com by users with custom profile pictures and unrestricted privacy settings.

Example

The following example is based on data gathering that occurred in 2008 based on Twitter. Since that time, Twitter and other OSNs have grown significantly in their number of users. However, the data gathering techniques and the exemplary embodiments for determining outliers in social networks remain applicable. The exemplary embodiments for determining outliers becomes even more relevant and efficient as the OSNs continue to grow. In this example, the first dataset ("crawl") gathered by a constrained crawl of the Twitter network, was seeded by collecting the public timeline at four distinct times of day (2:00, 8:00, 14:00, and 20:00 Mountain Time) and extracting the users that posted the statuses in these timelines. Each step in the crawl involved collecting details of the current user as well as a partial list of users being followed by the current user. During this process the median number of users followed by the previously crawled users, m, was tabulated. To further the crawl, the first m users followed by the current user would be added to the set of users to crawl. If the current user followed fewer than m users, all users were added to the set of users to crawl. It should be noted that while the users that posted statuses are clearly currently active, the list of users obtained in successive steps may not have been active. This first dataset is likely to include a certain fraction of passive users. The duration of data gathering was three weeks from January $22^{nd}$ to February $12^{th}$ and information about 67,527 users was obtained.

The second dataset ("timeline") was gathered via the public time-line command to sample currently active Twitter users. Twitter continually posts a series of twenty most recent status updates. Samples were made by retrieving the public timeline and extracting the set of users associated with the statuses in the timeline. Details of these users were then collected. Once details of the users from the previous timeline were gathered the public timeline was queried again to find the next set of users. This process was repeated for a period of three weeks (January $21^{st}$ to February $12^{th}$) resulting in samples from various times of day and days of the week. Information about 35,978 users was gathered in this dataset.

Finally, to examine potential bias in our constrained crawl, an additional dataset of 31,579 users was gathered between February $21^{st}$ to February $25^{th}$, via the Metropolized random walk with backtracking, used for unbiased sampling in P2P networks. Note that this crawl required fewer requests as we considered only one child of each node and the rate limiting was slightly relaxed. Our analysis presents results on all the datasets with comparisons as warranted.

With nearly 100,000 users in the three datasets combined, we believe that we can extract broad attributes of Twitter users. We begin by examining the number of users each user follows and the number of users they are followed by, to get an idea of the nature of connections between users in micro-content social networks.

Figure 2:
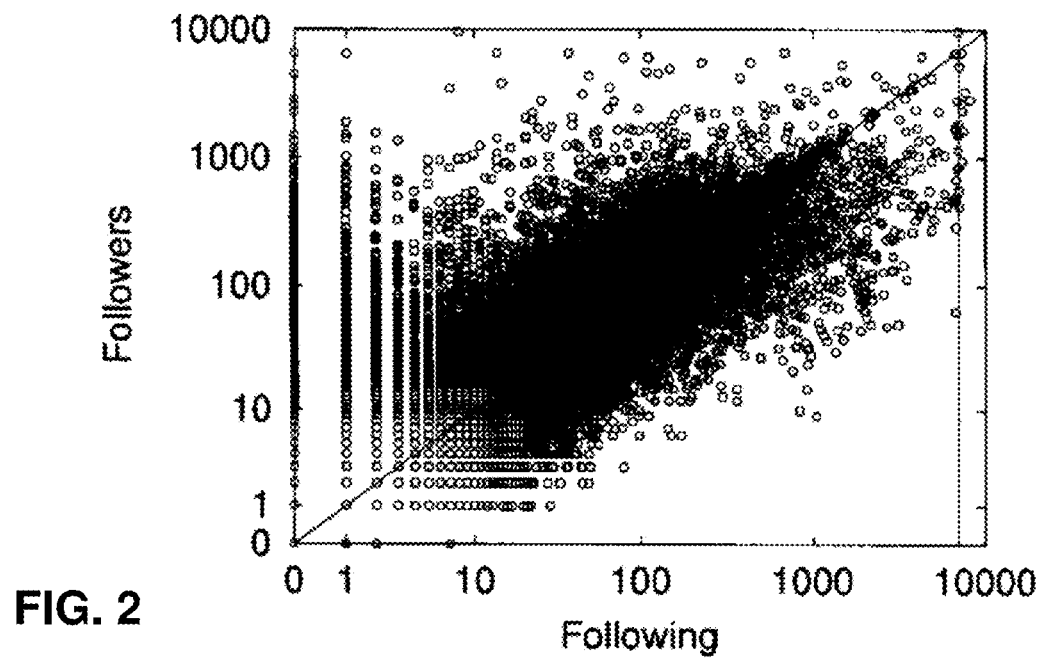
FIG. 2 depicts an illustrative embodiment of a scatterplot crawl of users' following and follower count for Twitter.
Figure 3:
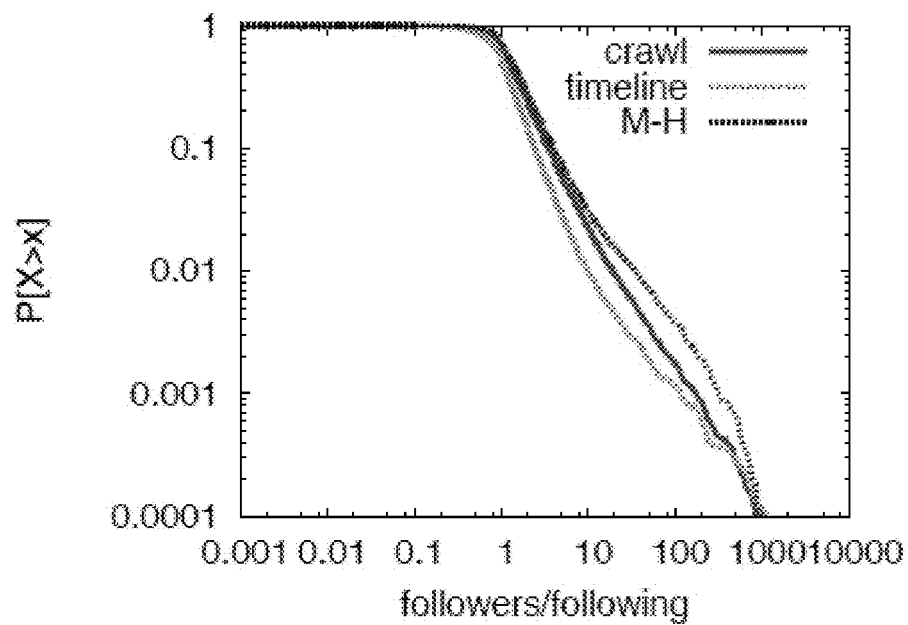
FIG. 3 depicts an illustrative embodiment of a Complementary Cumulative Distribution Function (CCDF) of users' following and follower count for Twitter.
Figure 4:
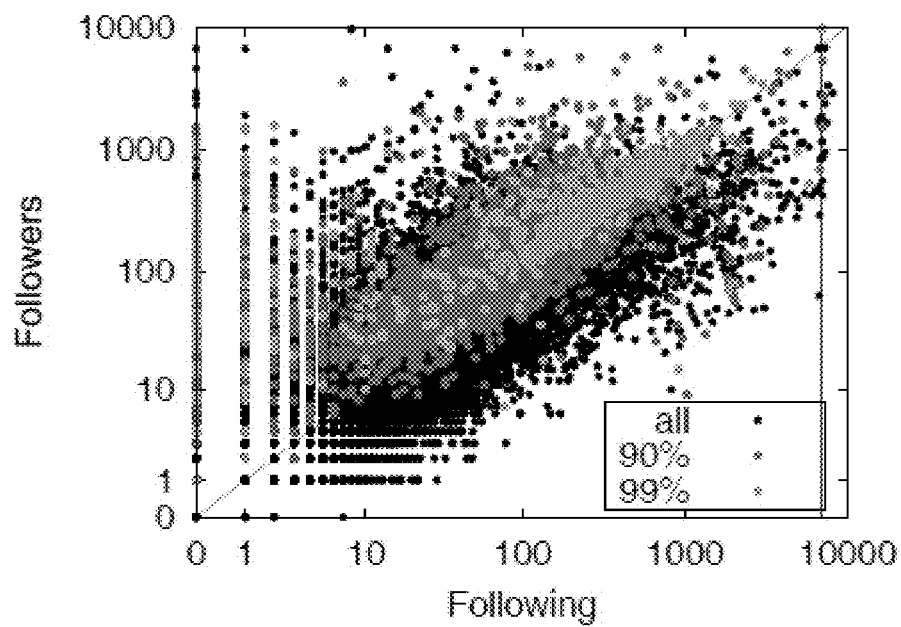
FIG. 4 depicts an illustrative embodiment of a scatterplot of crawl users' following and follower count, by status update level for Twitter.

The relationship between the number of followers and following is explored in FIGS. 2-4. These relationships between users can be utilized to assist in determining outliers in OSNs, such as follower and following relationships in Twitter, and friend relationships in other OSNs. FIG. 2 shows a scatter plot of the follower/following spread in the crawl dataset. Three broad groups of users can be seen in this figure. The first group appears as vertical lines along the left side of FIG. 2. These users have a much larger number of followers than they themselves are following. This behavior characterizes broadcasters of tweets. Many of the users here are online radio stations, who utilize Twitter to broadcast the current song they are playing. Others include the New York Times, BBC, and other media outlets generating headlines.

A second group of users labeled acquaintances, tend to exhibit reciprocity in their relationships, typical in online social networks. Users in this group appear in the large cluster that falls (roughly) along the line y=x in FIG. 2.

A third unique group of users is a small cluster around the line x=7000 in FIG. 2. A common characteristic of these users is that they are following a much larger number of people than they have followers. Such behavior is typical of miscreants (e.g., spammers or stalkers) or evangelists, who contact everyone they can, and hope that some will follow them. For example, one month after the crawl data was collected, one of the users in this group has increased his following count from 7,462 to 31,061. Over this same period, his number of followers has decreased from 3,333 to 3,260.

The top datapoint on x=7000 is John Scoble, a technical blogger who follows roughly 70% of the people who follow him. The vertical lines corresponding to x=1, 2, . . . 10 in FIG. 2 happen to be broadcasters as well who are following the primary broadcaster at x=0. For example, a top broadcaster somafm illstreet (140,183 updates) has 213 followers, and is following 11, all of whom are sister radio stations.

FIG. 3 shows the ratio of followers and following for all three datasets. This figure indicates that the groups identified in FIG. 2 appear in all three datasets. The bulk of the users exhibit roughly symmetric behavior. The head and tail of the distribution reflect the evangelists/miscreants and broadcasters, respectively. A lack of symmetric behavior can also be utilized to assist in determining outliers in an OSN.

Next we examine the relationship between the number of status updates ('tweets') and the following/follower relationship. FIG. 4 contains three sets of data points. The "all" data points plot the following/follower relationship for all users in the crawl data (same as FIG. 2). The "90%" and the "99%" data points plot the following/follower relationship for the top 10% (90th percentile—964 or more tweets during the user's lifetime) and the top 1% ($99^{th}$ percentile—1,727 or more tweets) of tweeters.

FIG. 4 shows that many of the users in the first group tweet frequently, confirming that they are broadcasters. In the acquaintances group, an interesting characteristic is that the following/followed relationships move closer and closer to complete reciprocity as the number of tweets increases; looking at the 99% data points, most of them fall reasonably close to the diagonal. Lastly, we find that most of the members in the third group are not among the top tweeters.

Twitter users can include their URL information; both URL and the UTC offset are present in nearly two thirds of users in crawl and timeline datasets. Comparing the domain information in the URLs with the UTC offset allows us to see popularity of Twitter in different countries. Users with URL in the .com domain are largely likely to be in North America but the UTC showed some of them to be in Europe as well. Beyond this, the rest of the UTC data lined up with the domain information. After the USA, the top 10 countries are Japan, Germany, U.K., Brazil, Holland, France, Spain, Belgium, Canada, and Italy. These eleven countries account for around 50% of users in our datasets.

Referring next to FIG. 14, the source interface used for posting Twitter messages is examined as shown in Table 1. In one exemplary embodiment, source interface data, such as gathered in Table 1, can be used in the determination of outliers in an OSN by identifying anomalies in the use of those interfaces for certain users or groups of users. Table 1 exemplifies that the manner of utilizing the particular OSN (e.g., Twitter) can be a factor in determining the outliers in the OSN. As described later, this factor can be accounted for through use of the communications graph in the outlier determination process. The distribution of sources are nearly identical in crawl and timeline datasets with the top dozen sources accounting for over 95% of all tweets. Nearly 60% come from "Web" which includes the Twitter.com Web site and unregistered applications that use the API. Mobile devices and Instant Messages have visible presence. A fifth of all status updates come from the various custom applications that have been written using the Twitter API. Twitter traffic increased significantly when the API was opened up. The custom applications are for different OSes (e.g., Twitterrific for Macintosh, Twitterwindows for Windows in Japanese), browsers (Twitterfox for Firefox), RSS feeds/blogs (Twitterfeed, netvibes, and Twitter tools), desktop clients (Twhirl, Snitter), OSNs (Facebook), and mobile clients (Movatwitter), and Instant Message tools.

Figure 5:
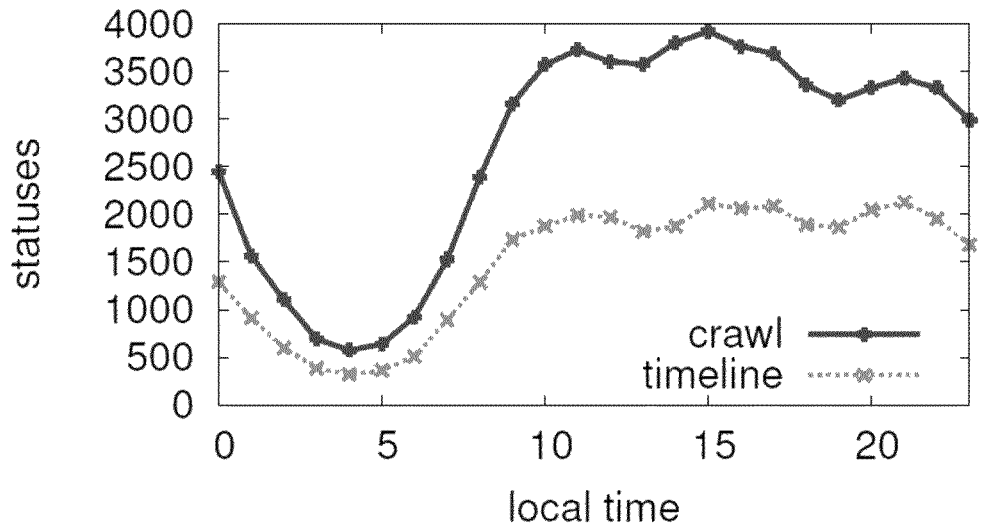
FIG. 5 depicts an illustrative embodiment of time of day status update of crawl and timeline datasets for Twitter.

FIG. 5 shows the time of day when status updates were posted (adjusted to local time of the updaters). This information can be utilized in determining outliers in a number of different ways. For instance, the distinction between statuses at different local times can be utilized to select a particular data gathering methodology, such as the timeline method rather than the crawl method, in an attempt to capture more active users. As another example, the difference in statuses at different local times can be a factor in determining the outliers such as through assisting in the selection of the particular induced graph(s) described later. There is no significant difference between the crawl and timeline datasets. The workload shows a rise during later morning hours, relatively steady use throughout the day, and drop off during the late night hours. There was no significant information in the patterns within days of the week (not shown). Also not shown, there is virtually no difference between the length of tweets in the crawl and timeline datasets.

Our methodology to gather Twitter data had a key constraint: we were limited by the Twitter user agreement in the number of requests we could issue each day. Yet, we were able to gather data about over 67,000 users via our crawl. At the same time we were able to fetch public timeline data made available by Twitter.

Drawing inferences about the global Twitter graph depends on the representativeness of the portion of the graph we have captured. The status updates in the timeline dataset are presumably a random snapshot of currently active users. As mentioned above, the crawl dataset could include users who have not been active recently. The representativeness of the crawl can require correction for bias towards high degree nodes; adding backtracking to the random walk is one way. We implemented the Metropolized random walk variant in the data collection and gathered the M-H dataset of over 31,000 users. The Metropolized random walk ignores the semantics of any particular graph. The connection model of the Twitter graph differing from a graph of users who exchange data in P2P networks should not have an impact.

The following is a comparison of various characteristics of the three datasets to see if differences can be explained based on our additional knowledge of the semantics of the Twitter application and its user population.

Figure 6:
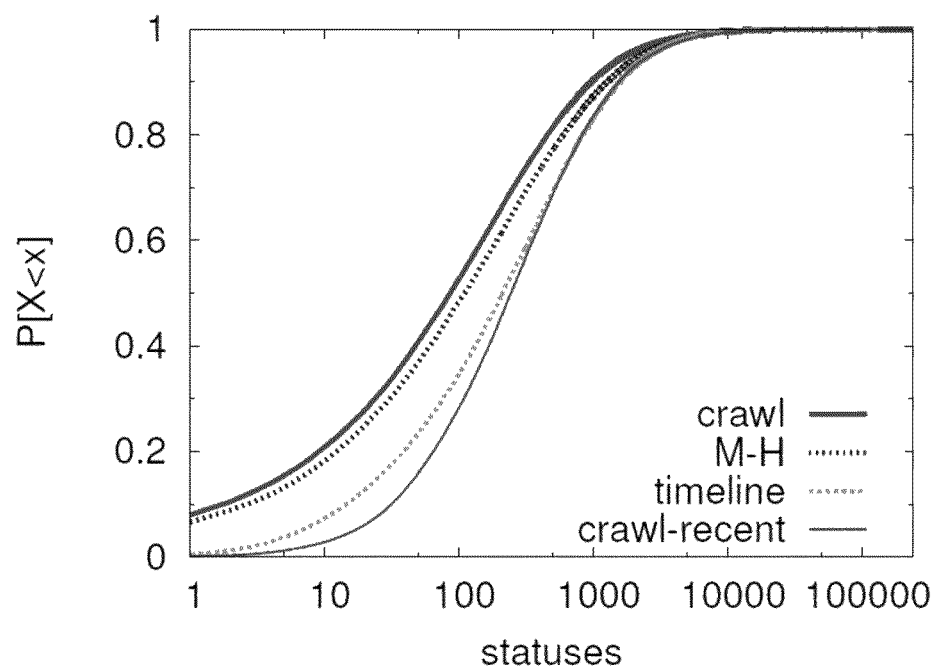
FIG. 6 depicts an illustrative embodiment of a CDF of count of statues comparing crawl and Metropolis-Hastings Algorithm (M-H) with timeline for Twitter.

FIG. 6 shows that the Metropolized random walk algorithm yields a portion of the Twitter graph that has nodes with very similar status count as the crawl dataset. As described above, this graph can be of assistance in determining the outliers in an OSN by indicating a particular data gathering methodology that may be more relevant to a particular type of user(s). Both have fewer statuses as compared to the active nodes represented in the timeline dataset. To confirm this, we examined the portion of users in the crawl data who tweeted during our data gathering—they also had a higher count of statuses.

Figure 7:
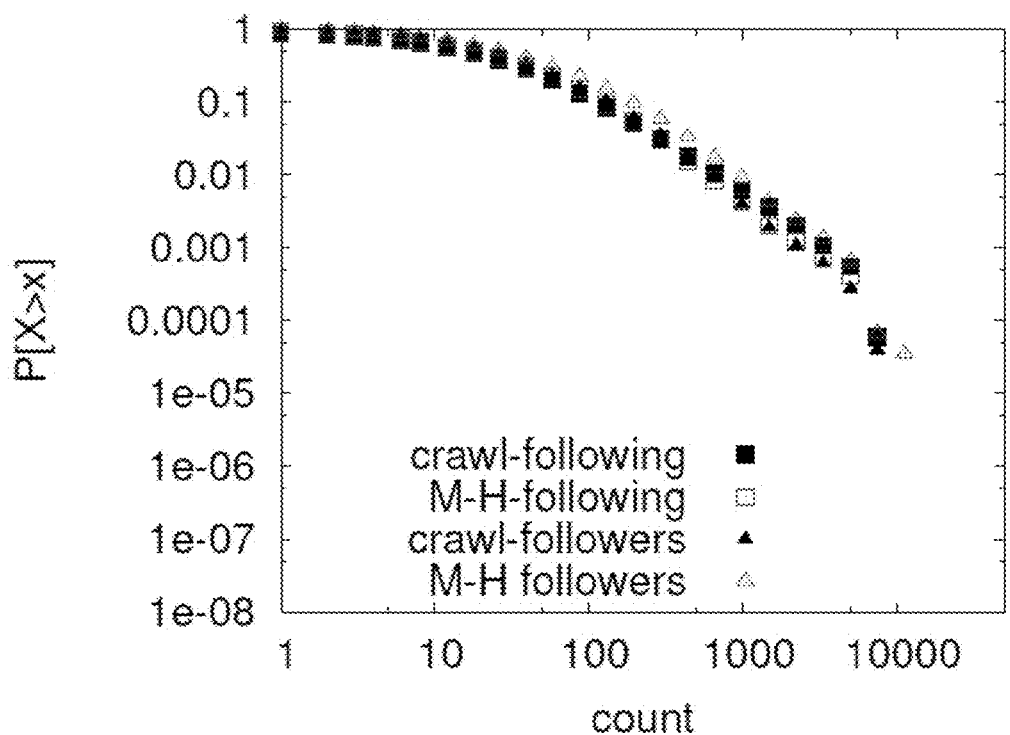
FIG. 7 depicts an illustrative embodiment of a CCDF of followers and following count for the three datasets for Twitter.

FIG. 7 shows the overall similarity of results between crawl and M-H datasets in the CCDF of the count of followers and following. M-H has slightly more followers. This figure depicts that there can be differences in the data gathered depending on the methodology utilized: crawl vs. M-H. These differences can be analyzed for determining which data gathering method should be employed when seeking to identify particular types of outliers ion an OSN.

Figure 8:
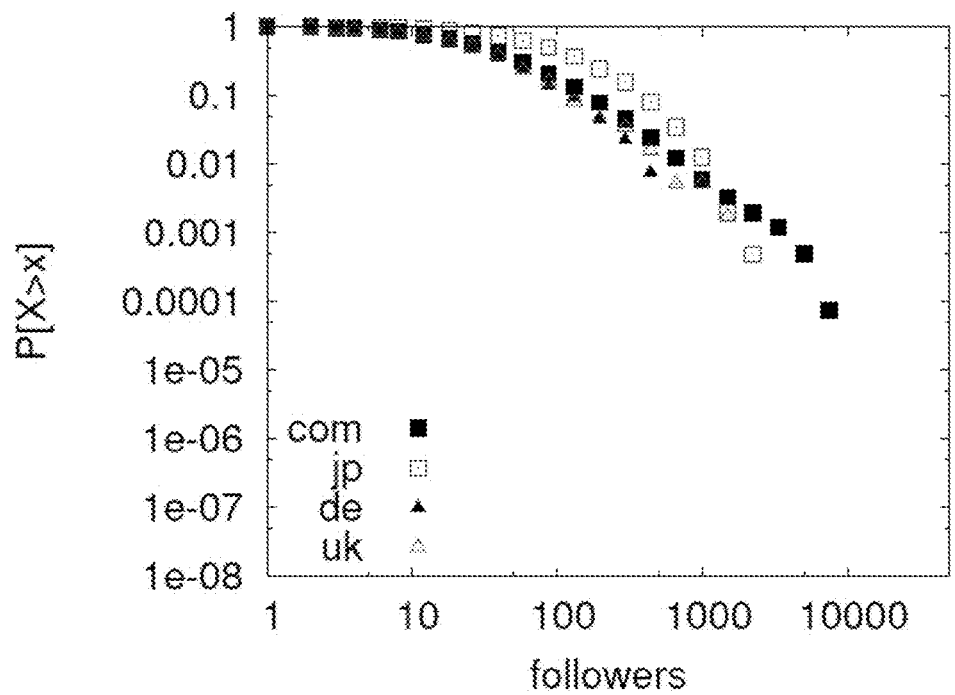
FIG. 8 depicts an illustrative embodiment of a CCDF of followers count for the top 4 domains for Twitter.
Figure 9:
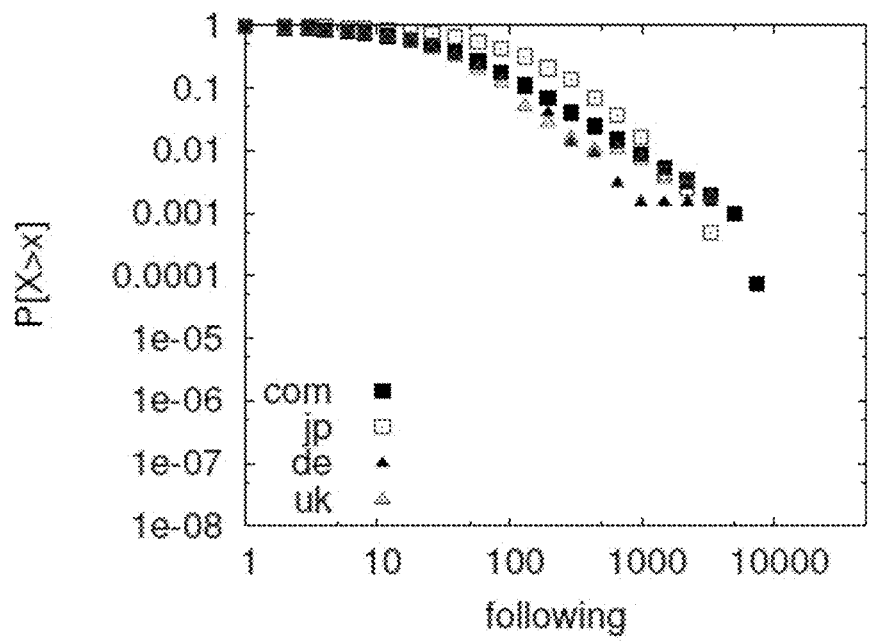
FIG. 9 depicts an illustrative embodiment of a CCDF of following count for the top 4 domains for Twitter.

FIGS. 8 and 9 show the CCDF of followers and following for the data restricted to users in the top four domains .com, .jp, .de, and .uk in the crawl dataset. FIGS. 8 and 9 depict the differences between users speaking different languages. These differences can also be factors that are utilized as part of the outlier determining process. Comparisons can be made within our dataset as we understand the Twitter milieu better and we want to stray from the conventional power law result. A higher friends and followers count can be seen in the .jp domain, perhaps reflective of the more connected nature and popularity of such technologies in Japan.

Figure 10:
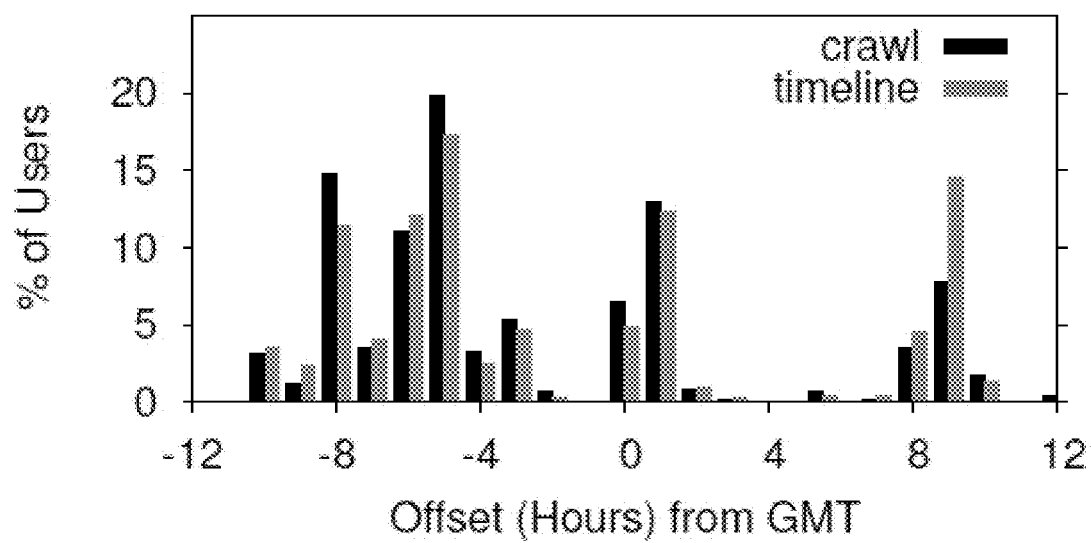
FIG. 10 depicts an illustrative embodiment of a histogram of Coordinated Universal Time (UTC) offset hours comparing crawl and timeline for Twitter.

Our datasets include several additional fields on each user including location and utc_offset. Both of these present indicia or clues to the geographical presence of the user. Comparing the crawl and timeline dataset with respect to these fields can also show representativeness of the crawl dataset. We examined the UTC offset attribute of each user. FIG. 10 shows the percentage of users in each UTC offset in the crawl and timeline datasets. As can be seen, there are many more users in the Japan timezone not captured in the crawl dataset as compared to the timeline dataset. There is also a cultural separation to a certain, expected, degree. Users with UTC of GMT+9 indicate a large group of users in the .jp domain. They use Japanese to communicate with each other, leaving out most of the English language tweeters. Similarly there are (smaller) clusters of German, Italian, etc. users who tweet to each other. Based upon this information as depicted in FIG. 10, particular data gathering techniques may be more appropriate depending upon the data set that is being targeted for outlier analysis. For example, the timeline approach can obtain more recent users and various kinds of users, while the crawl approach can obtain only users who are connected to the starting point. If some subsets of users are not connected to the starting point then they would not be represented in the dataset gathered by the crawl approach.

Figure 11:
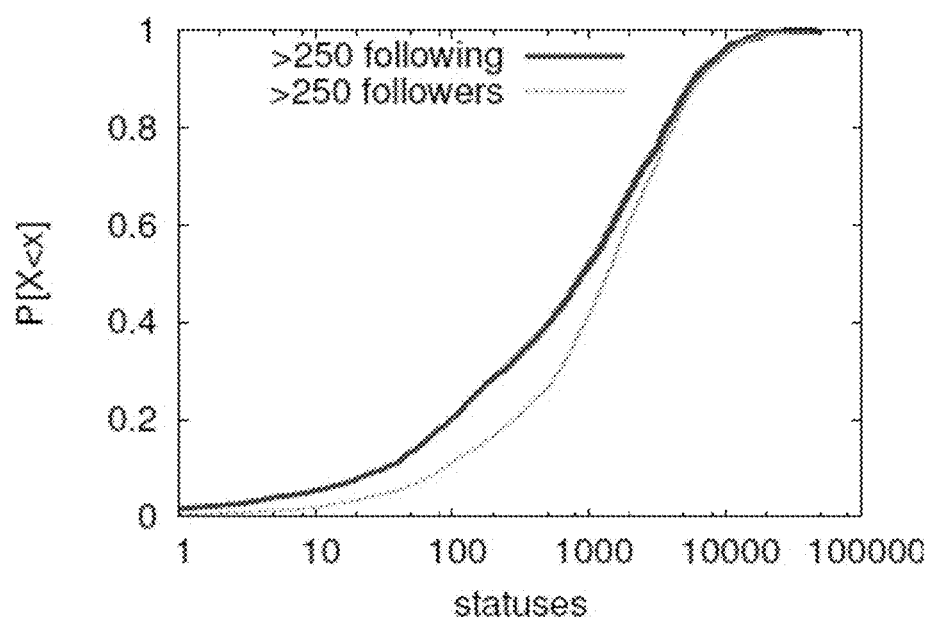
FIG. 11 depicts an illustrative embodiment of a CDF of heavy users and followers in crawl for Twitter.

We examined if highly popular users (those who have many followers) update their status more often than those who (likely passively) follow more users. This was true in both the crawl and timeline (not shown) datasets. FIG. 11 shows that crawl dataset users who have more than 250 followers send many more status updates than those who follow more than 250 users. The 250 cutoff value was chosen as it was just above the 95th percentile in both datasets. This information can also be used as part of the outlier determining process, such as identifying anomalies with respect to the number of status updates for certain groups of users.

Our examination of Twitter usage uses three different data collection techniques and examines their strengths and weaknesses. Based on the above information, particular data gathering techniques may be more suited for particular outlier determinations, such as using a timeline approach where the outliers are associated with a group of very active users, and so forth. It should be further understood that the exemplary embodiments can utilize other data gathering techniques that are not described herein.

While others have assumed sequential growth in userIDs; we demonstrated that this is not the case. We also factor in tweet count to show heavy tweeters tend to have a more reciprocal relationship. We further use both the top-level domain and UTC offset to identify location of a much larger fraction of users; and also examine the growth of users by geography. In addition, we examine number of tweets/user, time of day use, sources of tweets, and distribution of userIDs.

In this example, we examined geographical distribution, the user base of a new, popular, micro-content network. We compared the results of our constrained crawl against other datasets to show similarities in results. Analysis can also be performed on the shift in Internet traffic towards program or machine generated data and consumption by processes or filters on behalf of human users. The explosion of automatic generators may lead to further split traffic streams.

OSNs have become very popular and are now an integral part of lives of large fraction of Internet users. Nearly half a billion people are on OSNs. Various characterizations have been carried out about a 'social graph' induced by relationships arising in OSNs. A social graph can be induced by the behavior of individual users, or collections of users. Behavior such as friendships formed in OSNs, criteria for inclusion or exclusion of uses in groups, the application utilized by users, and so on, can dictate how social graphs are induced by individual and collective behaviors. Macro graphs of OSN users and sub-communities thereof can also be identified along with frequent communicants.

The exemplary embodiments can identify induced sub-graphs, such as described in the above-example, based on various forms of seed information related to one or more persons or groups on OSNs. Among the applications of the present disclosure is use of the publicly available information for identifying outliers, such as for the benefit of law enforcement agencies. Many other applications of the methods described in the present disclosure are possible. For example, the present disclosure can be used to identify parties or entities that successfully commercialize goods or services by techniques which identify them as outliers.

The present disclosure provides for identifying or otherwise discovering communities in OSNs. For example, we can determine from the twitter crawl that it under-represented disconnected groups and the fact that Japanese speakers were disconnected from English Speakers, in the data described-above, is the reason that they were not seen in the crawl. Using ambient or publicly available information combined with intra-graph properties of OSN users, the exemplary embodiments can quickly isolate such communities. While in some instances outliers may be individuals, they may share properties enabling software applications tailored according to the present disclosure to examine them as a group.

Examining a set of associated sub-communities and interests of users in an OSN indicates that we could associate users with various induced graphs. These graphs can include:

1. Friends graph (set of friends, their friends etc.);
2. Application graphs (both internal and external applications);
3. Communication graph (type of communication including wall postings in for example FaceBook, Instant Messaging (IM), e-mail);
4. Regional Network/Group graph (allows geographic and interests inferencing);
5. Content type (frequently accessed media types such as photos, videos, music, radio, etc.);
6. Action (search, messaging, intra-OSN actions).

Each of these associated induced graphs can contribute towards a signature of an OSN user. Many of the associated elements have a varying set of attributes. For example, each external application has a set of friends and non-friends associated with it, along with frequency of communication, duration of time spent etc. An external application in the OSN context can be a program that runs on a machine other than that of the OSN set of machines. The interaction with the application is enabled by the OSN. Applications interfacing to OSNs can have a popularity attribute, time and frequency of interaction, sizes of the groups interacted with etc.

There are several ambient (public) attributes associated with each OSN user which can be detectable. These include global and local attributes. Global attributes include geographical location and identifiable entities such as phone numbers (area code, exchange, email address, zip code, etc.). Local attributes include common actions performed while on the OSN. Local attributes can include common actions performed while on the OSN such as clicking on pictures, clicking on friends' profiles, etc. Basically actions performed while a user is logged into the OSN that largely stay inside the OSN (i.e., does not require interaction with any entity beyond that of the OSN such as an external application).

With seed information regarding one or more users (or a group), the exemplary embodiments disclosed herein can isolate a signature of individual or groups of OSN users to determine if they are distinct enough from a random sample of the overall set of OSN users. This can be done in isolation or by examining a collection of OSN users (e.g., the seed user and their friends). One way of comparing seed information to a random sample of OSN users is to compare some or all of the induced graphs subject to a size threshold of a total population of OSN users. For example, if the seed information is associated with a regional group of a large size, then it is unlikely to contribute to distinguish ability of OSN users. In one embodiment, the type of seed information can be utilized for determining which of the induced graphs are to be utilized in the analysis.

Suppose a seed belongs to a regional network on an OSN (e.g., Facebook) having a million users. It would be difficult to identify a person's behavior from any of the other million users based on this attribute alone. If the seed, instead, belongs to a much smaller regional network with a size of a few hundred, then the problem is simplified. Thus, by judicious choice of thresholds for the various induced graphs and attributes, we can reduce the size of the set of OSN users to be analyzed. If the signature is distinct then additional tailored examination can be carried out. Privacy profiles of users, groups or entities can be included in a seed set which can also be compared with that of the random population of OSN users.

It has been determined that communities can be formed on the basis of simple metrics like comparing friends and followers (on Twitter) or the grouping based on geographical attributes (e.g., Japanese Twitter users identified as a result of their choice of Kanji to tweet each other). With seed information of an interested set of users, one can examine if OSN users have any special distinguishing properties. With ambient (public) information about friends of a party identified by seed information, one can further reduce the risk of false positives when searching for outliers. Such examination can be carried out in multiple OSNs some of which diverge in their characteristics (e.g., symmetrical friendship requirement in FaceBook contrasted to asymmetrical ones in Twitter). Aggregator feeds can also be examined for presence in multiple OSNs.

OSNs, like Facebook, can have a very large population of users (e.g., 300 million users). The present disclosure provides a method to reduce a sample size to locate outliers in OSN networks. Seed information in any format can provide a means to reduce the sample size of users. Seed information can represent any form of information that can identify a subset of a total OSN sample. For example, seed information can be represented by a person's interests, name of person or persons, name of an entity or entities, name of friends of a person, zip code, county, static IP address, etc. An entity in the present context can mean a corporation, a partnership, a product, goods, service, or any abstraction which may have relevance in identifying OSN users. Social graphs induced by OSN usage behaviors can be independently analyzed from public information accessible from OSNs.

Additionally, generalizations can be made about OSN users and groups thereof such as, for example, the average number of friends associated with a user, the volume of applications used by OSN users, the frequency and volume of inter-OSN relationships, and so on. Seed information can be used to reduce a large sampling size of OSN users to a manageable and searchable level. The social graphs and generalizations derived from publicly available OSNs can be used in conjunction with the seed information to identify outliers to clearly fall outside of the common norm of the social graphs and/or generalizations identified ahead of time. With the present method, outliers can be identified rapidly without analyzing a full OSN sample size.

Figure 12:
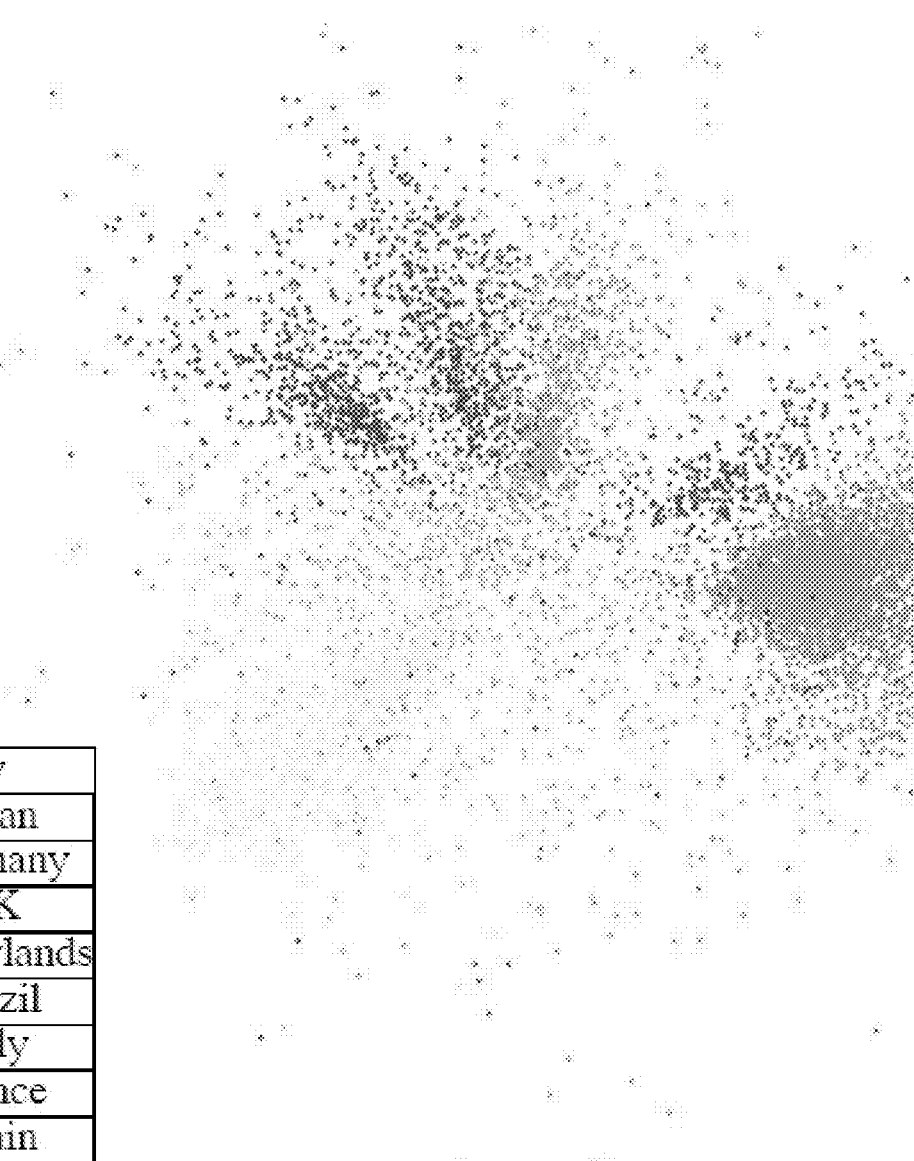
FIG. 12 depicts an illustrative embodiment of Twitter users by geographic location.

FIG. 12 is a visual representation of the strongly connected component of the Twitter user connection graph. The shades in plot 1200 show that nodes in that shade bar are largely communicating with each other (of the same shade). This is most pronounced for Japanese users who largely (almost exclusively) tweet in Kanji and thus don't have English-speaking Twitter "followers." The Europeans tweet in their primary language but have English speaking friends or individuals in the U.S. speaking both languages. Plot 1200 can be utilized in the outlier determination process to isolate groups by cultural and/or linguistic differences, through filtering or the like. By isolating or filtering the groups from a much larger population of users (e.g., 100 Million) to a more manageable population of users (e.g., 3 Million), the identification of outliers within that population can more easily be discerned.

Figure 13:
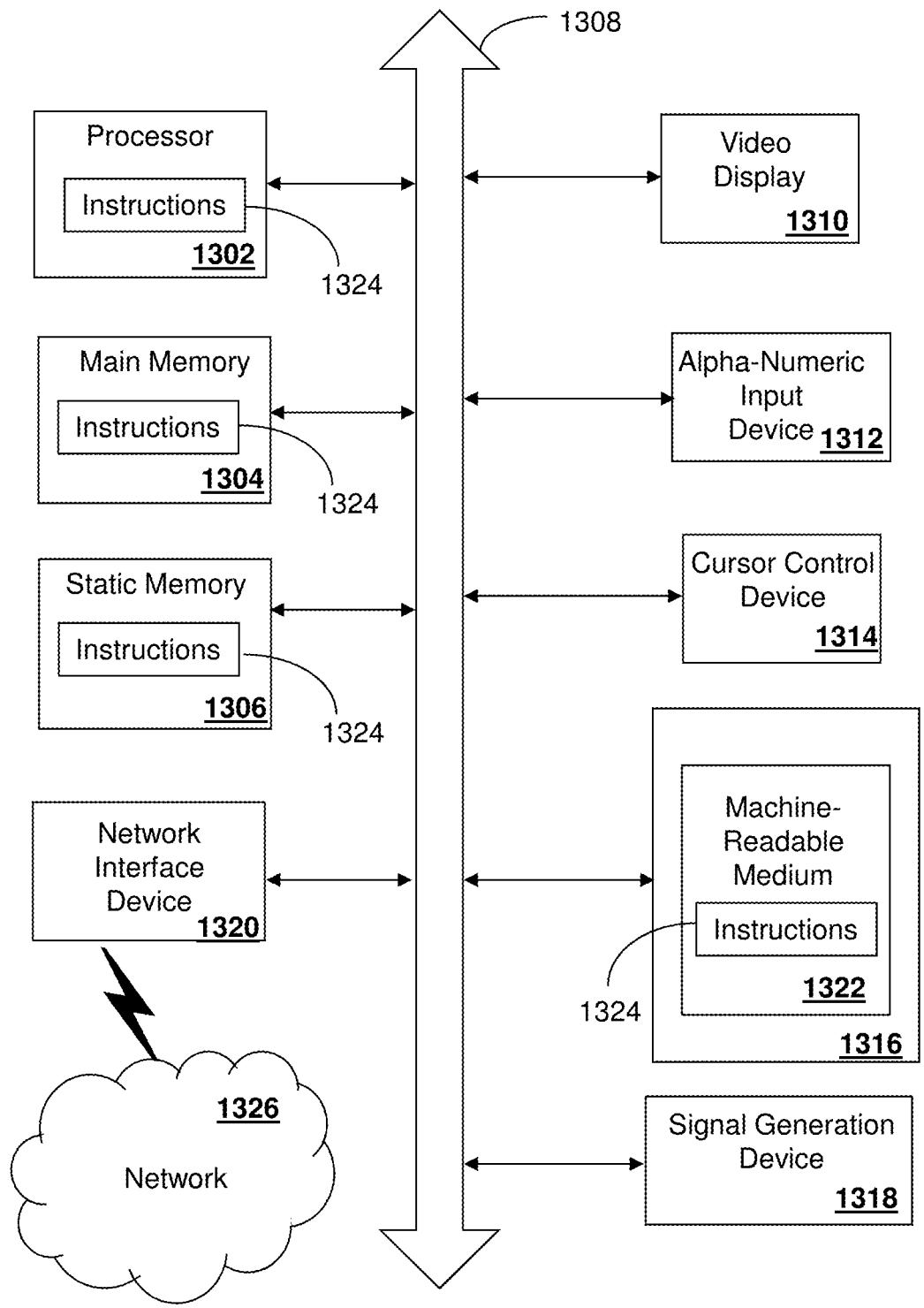
FIG. 13 is a diagrammatic representation of a machine in the form of a computer system within which a set of instructions, when executed, may cause the machine to perform any one or more of the methodologies discussed herein.

FIG. 13 depicts an exemplary diagrammatic representation of a machine in the form of a computer system 1300 within which a set of instructions, when executed, may cause the machine to perform any one or more of the methodologies discussed above. The machine can operate to gather or otherwise obtain seed information; reduce a sampling size of a total population of OSN users according to the seed information; compare the reduced sampling of OSN users to at least one of one or more social graphs or generalized profiles of OSN users determined from the total population of OSN users; and identify one or more outliers in the reduced sampling of OSN users that do not conform to the one or more social graphs or generalizations of OSN users.

In some embodiments, the machine operates as a stand-alone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising: reducing, by a system comprising a processor, a sampling size of a total population of social network users of an on-line social network based on a comparison of seed information to a population of the social network users to obtain a reduced population of social network users of the on-line network; sampling, by the system, the reduced population of the social network users utilizing a Metropolized randomized walk algorithm to obtain first sampled social network users; sampling, by the system, the reduced population of the social network users utilizing a crawl algorithm that includes non-active users of the on-line social network to obtain second sampled social network users; generating, by the system, a social network graph based on the first sampled social network users and the second sampled social network users, wherein the social network graph comprises an arrangement of the first sampled social network users and the second social network users based on relationships between members of the first sampled social network users and the second social network users arising in the on-line social network; identifying, by the system, a cluster of social network users within the arrangement of the first sampled social network users and the second social network users of the social network graph; characterizing, by the system, the reduced sampling of the social network users based on the cluster of the social network users of the social network graph; and identifying, by the system, an outlier in the reduced sampling of the social network users based on the characterizing of the social network users, and based on collateral information combined with an intra-graph property of the social network graph, wherein the outlier does not conform to the social network graph.

2. The method of claim 1, wherein the seed information comprises privacy profile settings, geographic information, behavioral pattern information, user information or combinations thereof of the social network users, and wherein the randomized walk comprises a Metropolis Hastings algorithm.

3. The method of claim 2, wherein the seed information further comprises information associated with the social network users having a relation to a party who may not be a social network user.

4. The method of claim 1, comprising determining, by the system, the social graph from a crawl procedure applied to the on-line social network.

5. The method of claim 1, wherein obtaining the seed information comprises receiving from a third party the seed information, and wherein the method further comprises receiving, by the system, the social graph.

6. The method of claim 1, wherein the generating of the social network graph comprises applying a randomized-walk algorithm to the reduced sampling of the social network users.

7. A device, comprising:
a memory that stores executable instructions; and
a processor coupled to the memory, wherein execution of the instructions by the processor facilitates performance of operations comprising:
obtaining a reduced sampling of social network users of a population of social network users of an on-line social network based on a comparison of seed information to the population of social network users;
sampling the reduced population of the social network users utilizing a Metropolized randomized walk algorithm to obtain first sampled social network users;
sampling the reduced population of the social network users utilizing a crawl algorithm that includes non-active users of the on-line social network to obtain second sampled social network users;
generating a social graph based on the first sampled social network users and the second sampled social network users, wherein the social graph comprises an arrangement of the first sampled social network users and the second social network users based on relationships between members of the first sampled social network users and the second social network users arising in the on-line social network; identifying a cluster of social network users within the arrangement of the first sampled social network users and the second social network users of the social graph;
characterizing the reduced sampling of the social network users based on the cluster of the social network users of the social network users of the social graph; and
identifying an outlier in the reduced sampling of the social network users based on the characterizing of the reduced sampling of the social network users, and based on collateral information combined with an intra-graph property of the social graph, wherein the outlier does not conform to the social graph.

8. The device of claim 7, wherein the collateral information comprises one of ambient or publicly available information.

9. The device of claim 7, wherein the algorithm comprises a randomized-walk algorithm.

10. The device of claim 7, wherein the seed information comprises one of geographic information, behavioral pattern information, user information, or information associated with the social network users having a relation to a party who may not be a social network user of the on-line social network.

11. The device of claim 10, wherein the social graph is based on relationships arising in the on-line social network of the social network users.

12. The device of claim 11, wherein some of the social network users are followers, following on-line activity of others of the social network users being followed, and wherein the intra-graph property comprises a ratio of followers to followed.

13. The device of claim 7, wherein the social graph indicates one of a type of user communication, a content type or a user action.

14. A non-transitory, machine-readable storage medium, comprising executable instructions that, when executed by a processor, facilitate performance of operations comprising:
reducing a sampling size of a population of social network users of an on-line social network based on a comparison of seed information to the population of the social network users to obtain a reduced sampling of the social network users; sampling the reduced population of the social network users utilizing a Metropolized randomized walk algorithm to obtain first sampled social network users;
sampling the reduced population of the social network users utilizing a crawl algorithm that includes non-active users of the on-line social network to obtain second sampled social network users;

generating a social graph based on the first sampled social network users and the second sampled social network users, wherein the social graph comprises an arrangement of the first sampled social network users and the second social network users based on relationships between members of the first sampled social network users and the second social network users arising in the on-line social network;

identifying a cluster of social network users within the arrangement of the first sampled social network users and the second social network users of the social graph;

characterizing the reduced sampling of the social network users based on the cluster of the social network users of the social network users of the social graph; and determining an outlier in the reduced sampling of the social network users based on the characterizing of the reduced sampling of the social network users, and based on one of ambient or publicly available information combined with an intra-graph property of the social network users, wherein the outlier does not conform to the social graph.

15. The non-transitory, machine-readable storage medium of claim 14, comprising determining the social graph from a crawl procedure applied to the on-line social network.

16. The non-transitory, machine-readable storage medium of claim 14, wherein the seed information comprises one of geographic information, behavioral pattern information, or user information.

17. The non-transitory, machine-readable storage medium of claim 16, wherein the seed information further comprises information associated with the social network users of the on-line social network having a relation to a party who may not be an social network user of the on-line social network.

18. The non-transitory, machine-readable storage medium claim 14, wherein the algorithm comprises a randomized-walk algorithm.

19. The non-transitory, machine-readable storage medium of claim 14, wherein obtaining the seed information comprises receiving the seed information from a third party, and wherein the operations further comprise receiving the social graph.

20. The non-transitory, machine-readable storage medium of claim 14, wherein the social graph indicates one of a type of user communication, a content type or a user action.

* * * * *

UNITED STATES PATENT AND TRADEMARK OFFICE
CERTIFICATE OF CORRECTION

PATENT NO. : 9,443,024 B2  Page 1 of 1
APPLICATION NO. : 14/705123
DATED : September 13, 2016
INVENTOR(S) : Balachander Krishnamurthy It is certified that error appears in the above-identified patent and that said Letters Patent is hereby corrected as shown below:

In the Claims

In Column 16, Line 11, please insert the word -- of -- before the word claim.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*